Figure 8:
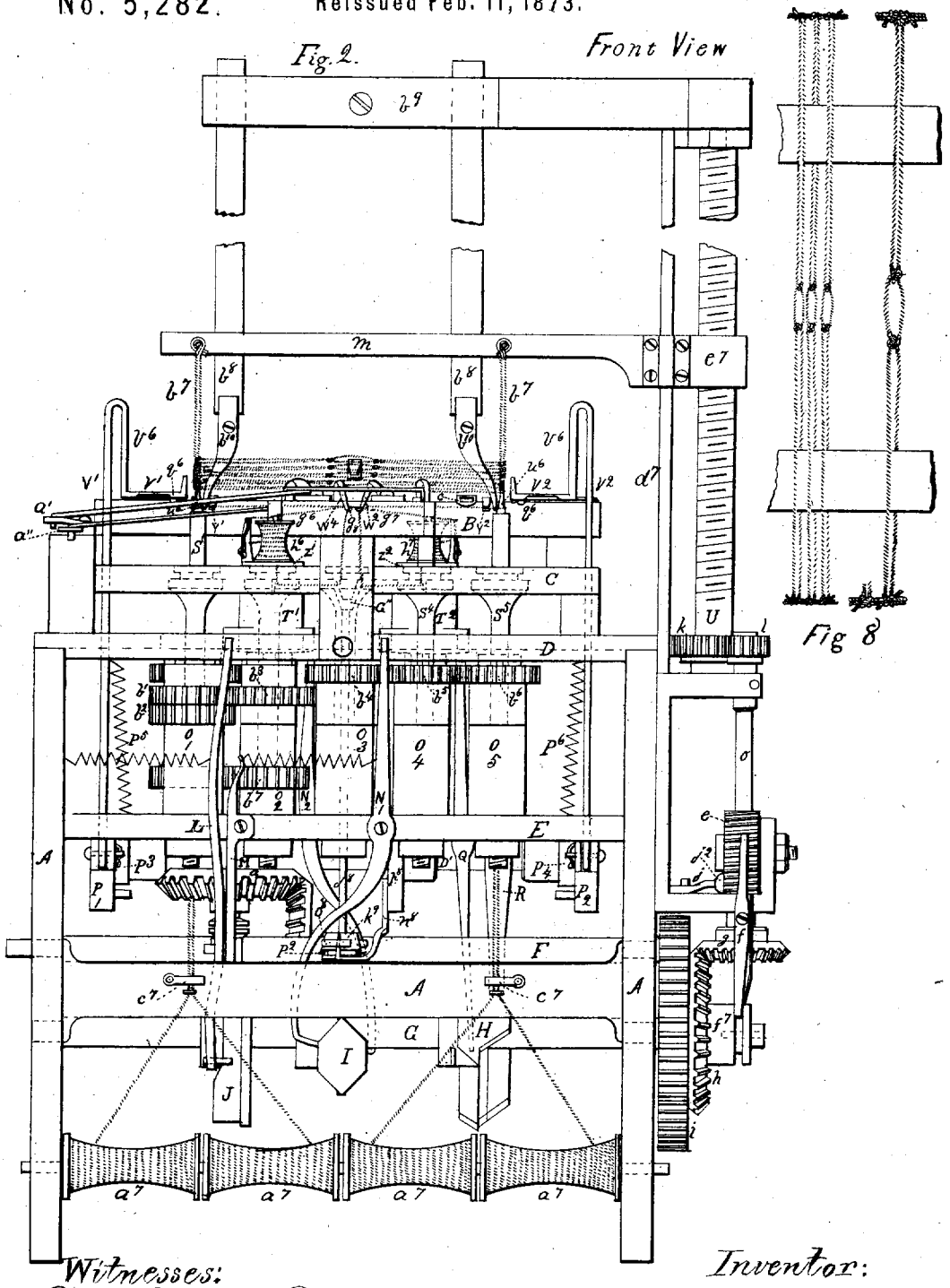

4 Sheets--Sheet 1.
J. S. WINSOR.
Machines for Making Weavers' Harness.
No. 5,282. Reissued Feb. 11, 1873.
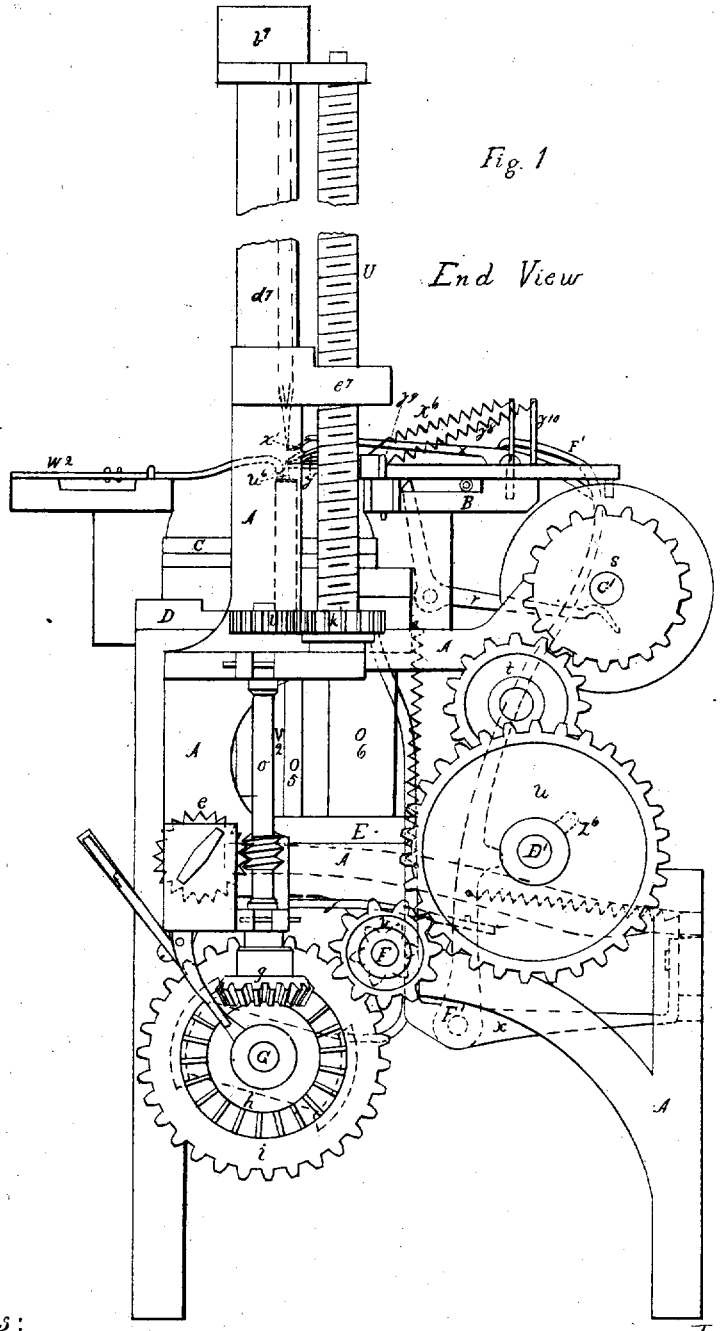
Witnesses:
Phil. F. Larner
Geo. W. Cushing, Jr.
Inventor:
Joseph S. Winsor
Cook & Fredrick Assignees
By Wm. Wood
Asso. Atty.
AM. PHOTO-LITHOGRAPHIC CO. N.Y. (OSBORNE'S PROCESS.)

J. S. WINSOR.

Machines for Making Weavers' Harness.

No. 5,282. Reissued Feb. 11, 1873.

Fig. 2. Front View

Witnesses:
Phil. F. Larner
Geo. W. Cushing, Jr.

Inventor:
Joseph S. Winsor
Coo & Hendrick Assignees.
By Mus Wood
Asst. Atty.

AM. PHOTO-LITHOGRAPHIC CO. N.Y. (OSBORNE'S PROCESS.)

J. S. WINSOR.
Machines for Making Weavers' Harness.
Reissued Feb. 11, 1873.
No. 5,282.
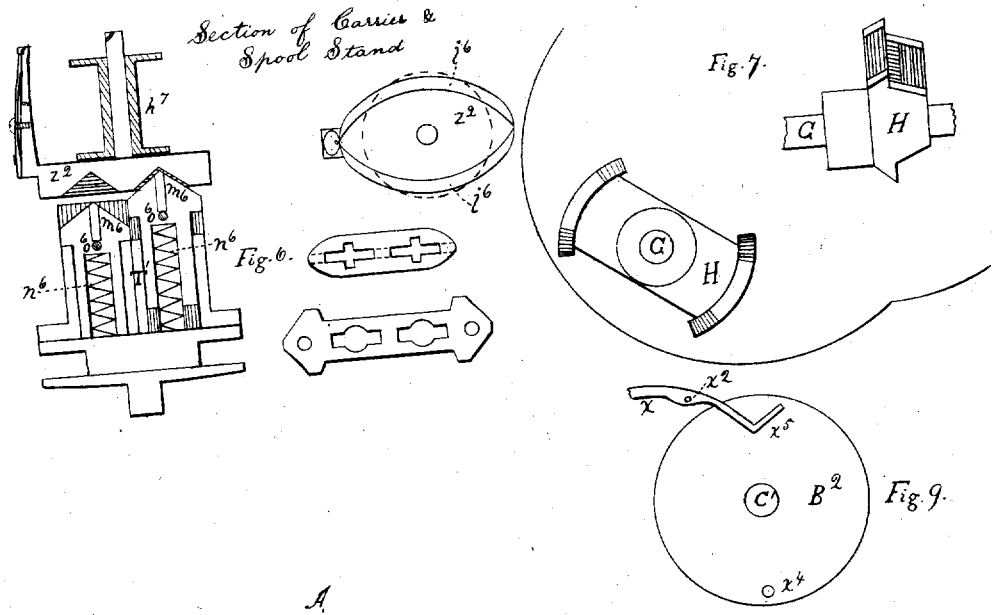
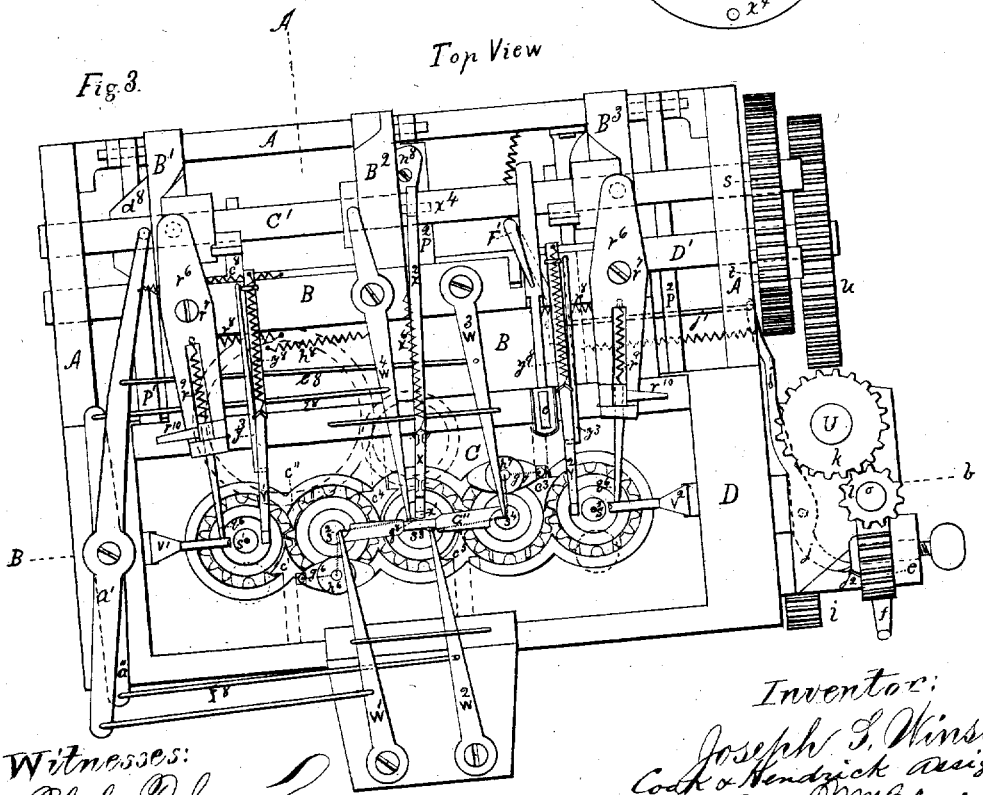
Witnesses:
Phil. F. Larner
Geo. W. Cushing, Jr.
Inventor:
Joseph S. Winsor
Cook & Hendrick assignees.
By Mm. C. Wood
Asso. Atty.
AM. PHOTO-LITHOGRAPHIC CO. N.Y. (OSBORNE'S PROCESS)

J. S. WINSOR.
Machines for Making Weavers' Harness.
No. 5,282. Reissued Feb. 11, 1873.
Fig. 5 B. b.
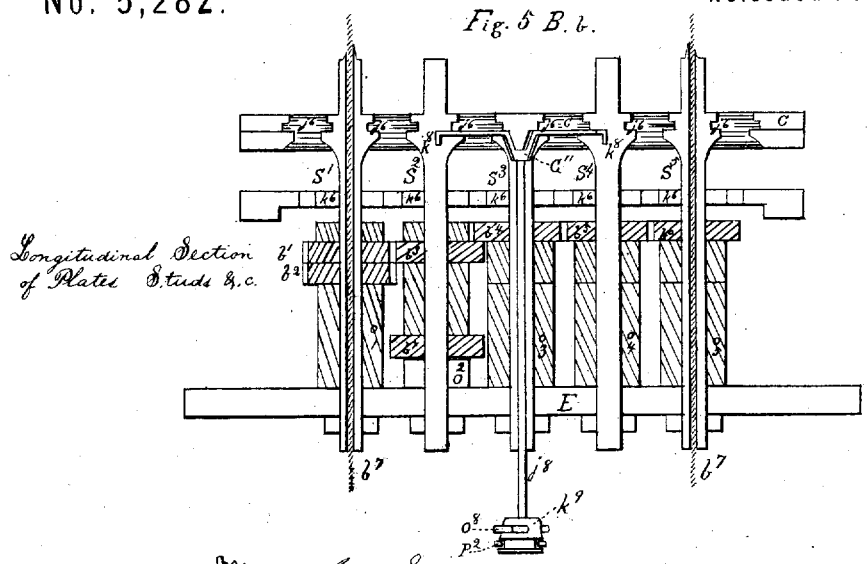
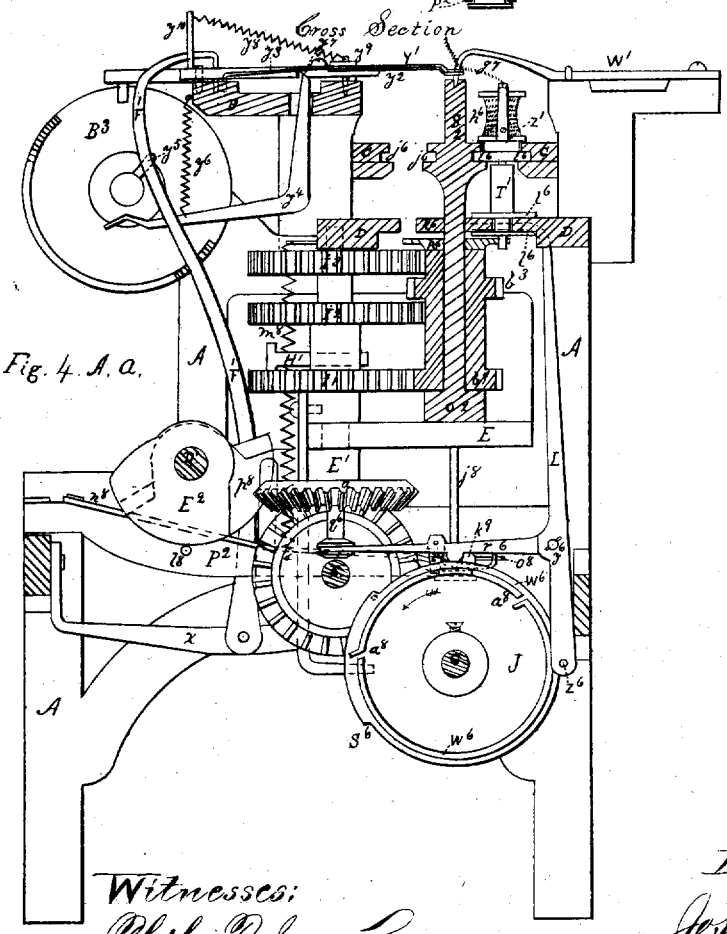
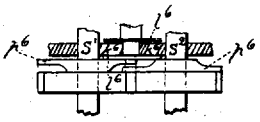
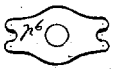
Witnesses:
Phil. P. Larner
Geo. W. Cushing, Jr.
Inventor:
Joseph S. Winsor
Cook & Wendrick Assignees
By Wm. C. Wood
Asso. Atty.
AM. PHOTO-LITHOGRAPHIC CO. N.Y. (OSBORNE'S PROCESS.)

UNITED STATES PATENT OFFICE.

JOSEPH S. WINSOR, OF PROVIDENCE, ASSIGNOR, BY MESNE ASSIGNMENTS, TO LYMAN A. COOK, OF WOONSOCKET, AND JOHN KENDRICK, OF PROVIDENCE, RHODE ISLAND.

IMPROVEMENT IN MACHINES FOR MAKING WEAVERS' HARNESS.

Specification forming part of Letters Patent No. 12,175, dated January 2, 1855; extended seven years; reissue No. 5,282, dated February 11, 1873.

*To all whom it may concern:*

Be it known that JOSEPH S. WINSOR, of Providence, in the State of Rhode Island, has invented a new and Improved Machine for Making Weavers' Harness, of which the following is a full, clear, and exact description, reference being had to the accompanying drawing making part of this specification, in which—

Figure 1 is an end view; Fig. 2, a front elevation; Fig. 3, a top view; Fig. 4, a vertical section taken at the line A *a* of Fig. 3; Fig. 5, another vertical section taken at the line B *b* of Fig. 3; Fig. 6, sections of the spool-carrier and spool on an enlarged scale; Fig. 7, sections, on an enlarged scale, of the switch-cam; and Fig. 8, separate view, on an enlarged scale, of the heddles.

The invention of the said WINSOR is of a machine for forming and tying weavers' leese-heddles of two twines by a continuous operation, which ties the two knots to form the eye, and a knot at each end around the bands, the same twines forming any number of heddles in succession, and all connected; and, although the said machine can readily make heddles without what is called the leese, yet an essential part of this invention relates to the making of leese-harness, as they are termed, which is essential in drawing in the net in mounting looms—that is, in passing the warp-threads through the eyes of the heddles. What is termed the leese in harness is having the two twines which form each eye at one end on one side of the corresponding shaft or rod, and at the other end one on each side of the other shaft or rod, which has the effect to keep the eyes of the several heddles in proper relation to each other, thereby greatly facilitating the operation of drawing in the web.

In the accompanying drawing, A represents a suitable frame, which may be varied to suit the judgment of the constructor. At the bottom of the frame are four spools, $a^7$ $a^7$ $a^7$ $a^7$, mounted horizontally on a rod, which carry the four twines that constitute the two bands $b^7$ $b^7$ of the harness, each band consisting of two twines. The two twines for each band pass under pressure-springs $c^7$ $c^7$, and thence through hollow vertical studs $s^1$ and $s^5$, and secured to a bar, *m*, above the machine, adapted to slide on a vertical standard, $d^7$, the bar being provided with a clamp-nut, $e^7$, which embraces a vertical feed-screw, U, by which the bar is gradually and regularly carried up with the two bands as the heddles are tied onto them; and the required motion is imparted to the feed-screw, from the main driving-shaft F, by a pinion thereon engaging a spur-wheel, *i*, on the shaft G, which carries a bevel-wheel, *h*, that engages a bevel-pinion, *g*, on a vertical shaft, *o*, which shaft, at its upper end, carries a spur-wheel, *l*, that engages a corresponding wheel, *k*, on the lower end of the feed-screw U. The bevel-wheel *h* runs loose on the shaft G, and is connected with it by a clutch-box, $f^7$, governed by a spring-lever, *f*, so that the attendant can at any time disengage the clutch-box to stop the feed-motion. The gearing for imparting the feed-motion may be varied at pleasure, and, if desired, it may be provided with intermediate shifting-wheels to vary the feed for finer or coarser heddles. As the heddles are formed in succession and tied to the bands they are drawn up by the upward motion of the bar and onto the two slats or rods $b^8$ $b^8$ of the harness. These two slats are temporarily secured by their upper ends to a clamp, $b^9$, secured to the frame of the machine, and there held over the two studs through which the bands pass; and to the lower end of these slats or rods are temporarily attached metal beaks $b^{10}$ $b^{10}$, which are slightly curved outward and pointed, the points extending down to and by the side of the stems on the first and fifth studs through which the bands pass, so that during the progress of forming the heddles they are gradually drawn onto the two slats, and when the required number of heddles have been formed, the slats are taken out of the clamp and the beaks removed, the heddles being completely mounted on the slats. The two twines $g^6$ $g^7$ to form the heddles are carried by two spools, $h^6$ $h^7$, mounted on two spool-stands, $Z^1$ $Z^2$, each provided with a standard by the side of the spool, through which the twine passes on the way to an eye in the top of the spindle on which the spool turns. A spring on the stand makes pressure on the twine to prevent it from giving out too freely. The base of each spool-stand is oval, with a projecting flange on each side of the bottom, as at $i^6$; and these flanges are fitted to a groove, $j^6$, formed by a rabbet in the lower and inner edge of a plate, C, resting on a corresponding plate below; and also by collars on a series of five studs, $s^1$ $s^2$ $s^3$ $s^4$ $s^5$, which stand all in a row. These five collars are circular, and the path of the spool-stands is made around them by cutting out the plate C, and corresponding plate below, in a series of five circles, all intersecting each other to such an extent as to make a pathway for the spool-stands all around each of the collars on the studs, with the groove $j^6$ on each side, to receive the two flanges $i^6$ of the spool-stands. The space between the several collars of the studs should be equal to the space between the collars and the plate C, that the spool-stand may pass between any two of the collars. The oval form is given to the spool-stands to enable them to travel in this curved track. The spool-stands are made to travel in their peculiar path by means of two carriers, $T^1$ and $T^2$, one for each spool-stand, and placed immediately below them. The path of the carriers corresponds with the path of the spool-stands, but made in a plate, D, below the plate C, and between this plate D and a corresponding set of collars, $k^6$, on the studs $S^1$ to $S^5$. The edge of this plate and the collars $k^6$ form a tongue, which is embraced by two sets of flanges, $l^6$ $l^6$, on the carriers.

The leese of the carriers embraced between the plate and the collars, as well as the two flanges, is of a form nearly elliptical, or, rather, formed by two segments of circles, united at their chords; and the body is of a corresponding form. The upper part of the carriers fit into cavities in the under part of the spool-stands in the following manner, viz: Each carrier is provided with two flippers, as they are termed—that is, two pieces, $n^6$ $n^6$, which are fitted to slide vertically in cavities made therefor, and provided with helical springs $n^6$ $n^6$, the tension of which constantly forces them upward to the position represented in Fig. 6, and they are prevented from being forced higher by check-pins $o^6$ $o^6$. The upper ends of these flippers are beveled off on opposite sides from the center, thus forming points, which enter the two corresponding cavities of the spool-stand, so that as the carriers and spool-stand travel along their path by means of a suitable instrument, to be presently described, the twines can be made to pass between the carrier and spool-stands, the said instrument, with the twine in it, first depressing one of the flippers, while the connection continues by means of the other; and when the first flipper is forced back to its original position the other is depressed. In this way the spool-stands and carriers pass the twines for the purpose of tying the knots without breaking the connection between the spool-stands and the carriers from which they derive motion.

Motion is imparted to the carriers $T^1$ and $T^2$ by means of chucks $p^6$, one on each wheel; and each chuck consists of two arms on opposite sides of the axis, with a recess or fork at the end of each to receive a pin at the lower end of the carriers. These chucks are attached to the hollow arbors of a corresponding set of spur-wheels, $b^1$ $b^3$ $b^4$ $b^5$ $b^6$, fitted to turn on the five studs, and resting on permanent collars $o^1$ $o^2$ $o^3$ $o^4$ $o^5$ on the lower end of the studs; or, instead thereof, resting on the surface of the plate E, to which the studs are attached.

The two spur-wheels $b^1$ $b^3$ mesh into each other, and to receive motion from a wheel, $I^2$, on a vertical shaft, $E^1$, which engages with a spur-wheel, $b^2$, on the hollow arbor of the wheel $b^1$, thus causing the two wheels $b^1$ and $b^3$ to turn in opposite directions, as well as the corresponding chucks connected therewith.

It is necessary, at certain parts of the operation, to make what is called the leese in the heddles, to reverse the motion of the chucks carried by the two wheels $b^1$ and $b^3$, and this is effected by having another spur-wheel, $b^7$, on the arbor of the wheel $b^3$, which engages a wheel, $I^1$, on the shaft $E^1$. The two wheels $I^1$ and $I^2$ run loose on the shaft, and are alternately clutched with the shaft by means of a sliding-clutch, $H^1$, fitted to slide in the shaft, and attached to a rod, $q^6$, fitted to the inside of the shaft, and extending down below it, where it is provided with a collar embraced by one end of a lever, $r^6$ turning on a stud-pin on a hanger, M, attached to the front of the frame. (See Fig. 2.)

By this means, when the lever is lifted up the clutch engages the wheel $I^2$, and when depressed the wheel $I^2$ is liberated and the wheel $I^1$ is clutched, which reverses the motion of the two wheels $b^1$ $b^3$ and the chucks connected therewith. The lever receives the required motions from the periphery of a cam, J, on the shaft G, which makes one revolution while the machine makes two heddles. The cam rotates in the direction of the arrow, and when the projection $S^6$ reaches the acting face of the lever it elevates it and clutches the wheel $I^2$, and keeps it clutched until the projection passes, at which time the lever and clutch, if desired, may be depressed by a spring or weight to clutch the wheel $I^1$; but it is preferred to make this motion more positive by means of a pin on the face of the cam-wheel, represented by dotted lines in Fig. 4, which acts on a lip projecting from a piece, $t^6$, attached to the lever. In this way the reversed motion is given at the periods required, as will be presently described. The spur-wheel $b^4$ engages the wheel $b^5$, which in turn engages the wheel $b^6$, and these receive motion constantly in the same direction from the same shaft $E^1$ by a spur-wheel, $I^3$, with an intermediate wheel, represented by dotted lines in Fig. 3.

In beginning the operation the spools should be placed the one $T^1$ in front of the stud $S^1$, and the other, $T^2$, in front of the stud $S^5$, as indicated by dotted lines in Fig. 3; and the twine from each spool is attached by a simple knot around the corresponding band $b^7$ and what is termed a stem. There are two of these stems, $U^6$ $U^6$—one on the upper end of each of the studs $S^1$ and $S^5$. They are inserted in the bore of the studs, and project upward and gradually brought to a point, and are cut at the side to permit the bands $b^7$ $b^7$ to pass through.

The machine being put in motion, the spool-carrier $T^1$, with its spool-stand and spool, is carried around to the right by the chuck $p^6$ on the stud $S^1$, and when it gets between this stud and the next stud $S^2$ the chuck on the wheel $b^3$ engages it, and just at that time the clutch $H^1$ is shifted from the wheel $I^2$ to $I^1$, which reverses the motion of the wheels $b^1$ and $b^3$, and with them the chucks that operate the carrier. At the same time a switch, $c^1$, is inserted, in the position represented at Fig. 3, to close the path of the carrier back of its present position. This is effected by a fillet-cam, $w^6$, projecting from the face of the cam J. The switch is attached to the upper end of a lever, L, that turns on a fulcrum-pin, $y^6$, so freely that it can vibrate freely in any direction. The lower arm of the lever is provided with a pin, $Z^6$, which at this time bears on the inner periphery of the fillet-cam, which is cut through for the passage of this pin at $a^8$ $a^8$, and on one side of each passage there is an inclined lip, which acts on the pin and forces it through. During this part of the operation the pin on the lever is carried from the inside to the outside, which forces in the switch to the position represented in Fig. 3, so that the carrier cannot go back while the wheels and chucks are reversed, and therefore is passed around the second stud $S^2$ once and a half, by which time it reaches a position between the second and third studs; and to do this it forces out of the way a spring-switch, $c^{11}$, which is so hung in the path of the carrier as to close the path at that place to prevent the carrier from passing it in the opposite direction, but not in the direction described. In the first half of the revolution of the carrier around the second stud the twine from the spool passes over the top of the second stud and against a finger hanging down from the end of an arm, $W^1$, which finger at this time is lying in a groove at the side of the upper end of the second stud. This arm $W^1$ turns on a fulcrum-pin at its rear end, and it is connected by a link to a lever, $a$, which is drawn in one direction by the tension of a spring, $c^8$, to keep the finger in its groove, and in the opposite direction by a cam-projection, $d^8$, on the cam $B^1$. This lever is in turn connected by a link, $e^8$, with a corresponding arm, $W^3$, on the other side, having a corresponding finger to act against the fourth stud on the other side, and to effect a like purpose in reference to the other twine. After the carrier has passed around, during its first revolution, beyond the second stud, and while the thread is stretched from the finger to the spool, it is caught by a hook, $g^8$, on the end of an arm, $W^4$, which catches the twine and carries it to the position represented in Fig. 3—that is, toward and over the end of the middle or third stud. This operation is effected by the action of the cam $B^2$ on the cam-shaft $C^1$, the arm being drawn back after the passage of the cam by the spring $h^8$. There is a corresponding hook on the arm $W^2$ on the other side to perform the corresponding operation with the other twine, and these two are connected together by links $i^8$ $i^8$ with the opposite ends of a lever, $a^{11}$, so that the arm $W^2$ will receive its motions from the arm $W^4$. This having been effected, the carrier passes around the second stud again, as before stated, to wind the twine once around the finger on the arm $W^1$.

During the operation already described with reference to the carrier $T^1$ and its spool and twine, the other carrier, $T^2$, with its spool and twine, has been performing corresponding operations on the other side, with the exception of the reverse motion of the wheels and chucks on the first and second studs; and these we will now trace. The carrier $T^2$, starting from its position in front of stud $s^5$, passes around to the left, and between the fifth and the fourth studs. At this time a switch, $c^3$, which lies in the path, is shifted to the right to close the path around the fifth stud to compel the carrier to be caught by the chuck on the fourth stud, and to pass around and back of the fourth stud, the finger and hook on the arms $W^3$ and $W^2$ performing the like offices as the corresponding ones on the other side. The switch $c^3$, above named, is on the upper end of an arm, O, which is acted upon by a cam, H, (see Fig. 7,) on the shaft G, the bevel being kept against the cam by the tension of a spring in the usual manner, but not seen in the drawing.

Now, then, the two threads being drawn by the two hooks on the arms $W^2$ $W^4$, and extending from the fingers on the two arms $W^1$ and $W^3$, with the hooks over the middle or third stud, these two threads are to be taken and drawn down to form two square loops of sufficient size to permit the spools and spool-stands to pass through them to form the knots. This is done by means of an instrument which is denominated the double depressor, $G''$, on the upper end of a spindle, $j^8$, fitted to the bore of the middle or third stud. This depressor consists of two wings projecting on opposite sides of the spindle, and at the upper end thereof. The outer end of each has a finger, $k^8$, which, as the spindle is turned, comes one against the second and the other against the fourth stud, to limit the extent of motion in that direction. The under face of each arm is grooved radially to receive the twines in the operation of depressing, and the inner and outer ends of each are notched to receive and guide the twine in the operation.

In the position of the parts before described the spindle of the double depressor is made to turn, to bring the two wings each over one of the twines drawn from its appropriate finger to the hook; and when this is done the entire depressor is drawn down to a level with the bottom of the spool-stand, so as to pass between the spool-stands and the spool-carriers, as before indicated, as the means of carrying the spool over the twine held at the time under the wings of the said depressor, the grooves in the wings protecting the twines as the spool stands and carriers pass the wings of the depressor. These motions are imparted to the spindle of the depressor by the following means: There is a collar, $k^9$, at the lower end of the spindle, which is embraced by the forked end of a lever, $P^2$; and this lever carries a pin, $l^8$, which is acted upon by a cam, $E^2$, on the shaft $D^1$ to depress the spindle, and after the cam has passed the lever is elevated by a spring, $m^8$; and on the top of this lever is jointed another lever, $n^8$, the outer end of which fits in a slot in a short arm, $o^8$, at the lower end of the spindle. This lever $n^8$ is acted upon in one direction by a spring, to turn back the depressor at the end of the operation, and in the opposite direction by means of a cam, $p^8$, on the shaft $D^1$, to turn the spindle and carry the wings over the twines preparatory to the depressing operation, which takes place afterward; and as the lever for turning is on the lever for depressing the spindle, the two operations can be performed in succession on the spindle.

The depressor having formed the two loops—one on the left with the twine from the spool of the carrier $T^1$, and the other on the right with the twine from the spool of the carrier $T^2$,—it becomes necessary that each twine should pass through its own loop to form the knot, and then that the twine from the spool of carrier $T^1$ should pass through the loop of the twine from the spool of carrier $T^2$, to be tied therein when the knot is drawn tight, and that the same operation should be performed by the twine from the spool of carrier $T^2$ to complete the eye of the heddle with the two knots, one at each end. These operations are thus performed: When the motions of the carriers and spool-stands were last described they were left, the one $T^1$ in front of the second stud, and the other, $T^2$, back of the fourth stud. From these positions the spool of carrier $T^1$ passes through the loop of its own twine, and thence back of the middle stud, and, switch $c$ having been shifted to close the path that leads back of the second stud and to open the path back of the third stud, the carrier is directed around and passes back of the third stud. This switch $c^4$ is on the upper end of a lever, $N^2$, acted upon by a cam, I, on the shaft G. This lever is acted upon in the opposite direction by a spring in the usual manner, (not shown in the drawing.)

There is a corresponding lever, $V^1$, acted upon in like manner by the cam I, which lever carries a corresponding switch, $c^5$, which performs a like office for the carrier $T^2$ on the other side of the middle stud; and in consequence, while the carrier $T^1$ has been passing through the loop on the left, and thence around and back of the middle stud, the carrier $T^2$ has been passing through the loop on the right side and around in front of the middle stud. They both continue their motion in opposite directions, and carrier $T^1$ passes its spool through the loop of the other twine on the right, while the spool of carrier $T^2$ passes its spool through the loop on the left. In this way it will be seen that each twine has been carried through its own loop to form the knots, and then each through the loop of the other twine. In this state of things the depressor begins to rise to liberate the two twines, that the two knots thus formed may be drawn tight to complete the eye of the heddle, and as the depressor rises the twines are drawn tight to close the knots by the continued motion of the carriers and their spools; the one $T^1$ passes around in front of the fourth stud, thence between the fourth and fifth, and around to the back of the fifth, the switch $c^3$ in that path having been carried back to the position represented in Fig. 3 by the action of the spring, as before described; and in the meantime carrier $T^2$, with its spool, has passed around the back of the second stud, and between the second and first to the front of the first stud. By the time the carriers have reached these positions the depressor has been elevated, and the twines composing the two knots and the eye continue to be held by the two hooks $W^2$ and $W^4$ and the fingers $W^1$ and $W^3$, and the two twines are respectively stretched from the knots through which they were passed, the one from the spool of carrier $T^1$ back of and against the stem $w^6$ on the upper end of the fifth stud, and the other from the spool of carrier $T^2$ in front of and against the stem $w^6$ on the upper end of the first stud. As the carrier $T^1$ passes around the outside of and to the front of the fifth stud, its twine passes outside of the band $b^7$, and in so passing it is brought against a hook, $q^6$, which, at the time, is lying near to the stem, and by which the twine is caught and drawn out preparatory to forming a loop. In the meantime the other twine from the spool of carrier $T^2$ has been carried through a like circuit around the front of the stem $w^6$ on the first stud and corresponding hook $q^6$, to be there formed into a loop. These two hooks $q^6$ $q^6$ are termed rocking-hooks, because they are each on the end of an arbor which has a rotary reciprocating motion like a rock-shaft. The arbors of these hooks are mounted, each, in a vibrating lever, $r^6$, that turns on fulcrum-pins $r^7$, and their rear ends are acted upon by the cams $B^1$ and $B^3$ on the shaft $C^1$ to carry the hooks outward from the first and fifth studs; and after the cams have passed the levers are drawn back to carry the hooks back toward the studs by springs $r^8$ $r^8$. The arbors are surrounded by helical springs $r^9$ $r^9$, the tension of which tends to turn the arbors in one direction, so that the hooks will liberate the twines, and they are turned in the opposite direction to hook and insure the holding of the twines by a small spur on each arbor, which, as the levers begin to move outward, strikes against a fixed stud, $r^{10}$. As before stated, the two carriers having carried the twines around these two hooks, they move outward, at the same time turning to insure the holding of the twines, and draw them out in a straight line from the stems, and under two single depressors, $V^1$ and $V^2$, which are grooved in their under faces for the same purpose as the wings of the double depressor. These depressors have each a vertical stem on the inner end grooved to act as a guide to the twine during the depressing operation; and the outer end is bent up at right angles, as at $V^6$, and then bent over at the upper end to form a vertical bar adapted to slide vertically in suitable ways in the frame; the object of this form is to leave an open space in which the hook lies during the depressing operation. The lower end of the two depressors are connected with two corresponding levers, $P^1$ and $P^2$, provided with stud-pins acted upon by two corresponding arms, $P^3$ and $P^4$. After the cams have passed, the levers, with the depressors, are elevated by springs $P^5$ and $P^6$. By the action of the cams the depressors are carried down to the same level described with reference to the double depressor, and for the same purpose—that is, each to form the appropriate twine in the form of a square loop, through which the spool-stand and spool can pass to carry each twine through its own loop to form a knot, when liberated and drawn tight, the horizontal part of the depressor alternately depressing the flippers in the carriers to enable the spool-stand to pass above and the carriers below, while the two continue to be in connection, that the spool-stand may continue to be carried by the carrier. The two depressors having been depressed, and the two loops formed, the carriers cause their spools to travel once more around the first and the fifth stud to pass through the loops and bring the carrier $T^1$ between studs 4 and 5, and carrier $T^2$ between studs 1 and 2; and during the last-described motion of the spool-carriers the two depressors have been elevated to their original position, the slack in the twines produced by the elevation of the depressors being drawn out by the continued motion of the spools. When the description of the operations for forming the loops at the ends of the heddle was commenced the two twines were left around the two fingers $W^1$ and $W^3$ and hooks $W^2$ and $W^4$, with the eye and the two knots not yet completed, and the two hooks over the spindle of the double depressor, and the two fingers, one against the second and the other against the fourth stud. In closing the eye and drawing the knots tight a considerable length of twine must be drawn out, and somewhat quickly, to effect the operation properly. This is done partly by the outward motion of the two spools, partly by the outward motion of the two rocking-hooks, and, finally, by the downward motion of the two single depressors. To effect the completion of the eye and the knots at each end the two fingers $W^1$ $W^3$ are carried gradually toward each other by the mechanism already described until they come within a distance which determines the length of the eye. The two knots are still one around one finger and one hook, and the other around the other finger and the other hook; but, before the two fingers approach, the wings of the double depressor must swing around out of the way, which is done by turning the spindle, the cam being so formed as to give this motion at the required time. So soon as the fingers have been brought to their inward position the two hooks $W^2$ $W^4$ are permitted by the mechanism before described to be carried outward until they reach their original position, at which time they are distant from each other the length of the eye and, therefore, gage its length preparatory to another operation. This leaves the two knots still on the two fingers, the points of which are conical, that the knots may be gradually closed as they are discharged therefrom by an instrument called the discharger, $x^1$. The forward end of this discharger is flat to extend over the surface of the twines composing the eye, and its rear end embraces and is adapted to slide on the end of a lever, K, that turns on a fulcrum-pin at $x^2$, and the rear arm of the lever is acted upon by a tappet, $x^4$, on the back of the cam-wheel $B^2$, (see Fig. 9,) which depresses the forward end of the lever to effect the discharge; and as the forward end is depressed the discharger is forced forward to get between the previously-formed heddle and completely over the eye to be discharged by its rear end striking against an inclined cam-face, $x^5$; and as the tappet passes away the lever is drawn up and the discharger drawn back by a spring, $x^6$, attached to the discharger and to the frame.

The downward motion of the discharger, to force the knots off the ends of the finger, takes place at the end of the downward motion of the two single depressors, which give the last pull to the two twines to complete the drawing of the knots tight. At this time it is necessary to hold the twines tight during the operation of completing the tying of the twines around the bands; and this is done by means of two pinchers, $Y^1$ and $Y^2$, one just inside of the first stud, and the other just inside of the fifth stud. The lower jaw is formed on the forward end of a bar, adapted to slide in suitable ways on the frame, and the upper jaw $y^1$ is a spring, the rear end of which is attached to the bar of the lower jaw; and the bar of the lower jaw has an inclined plane at $y^2$, and at this part a stem, $y^3$, attached to the frame by a long shank, lies between the two jaws, so that as the jaws are drawn back they are opened by the inclined plane sliding on the stem, which forces up the upper spring-jaw, and, as they are moved forward, they continue open, and the stem permits them to close only toward the end of the forward motion to take hold of and gripe the twine. They are moved back, to liberate a previously-held twine, by the action of a lever, $y^4$, acted upon in one direction by a tappet, $y^5$, and in the opposite direction by a spring, $y^6$. When the lever is acted upon by the tappet its upper arm strikes against a shoulder on the bar of the lower jaw and moves it back. The upper end of this lever is beveled, as represented in Fig. 4, and the bar of the lower jaw has a corresponding inclined plane at $y^7$, which rests on the end of the lever, so that when the lever is operated by the tappet to draw back the bar of the pinchers their forward end is depressed, and as the tappet passes, and permits the upper end of the lever to be returned or moved forward by the tension of the spring $y^6$, the bevel of the arm comes in contact with the inclined plane $y^7$, which rests thereon; and as the pinchers are carried forward to gripe a new twine, by the tension of a spring, $y^8$, attached to the frame at $y^9$, and to a stem on the bar of the pinchers at $y^{10}$, their forward end is depressed by the action of the inclined plane on the beveled end of the lever. In this way the pinchers are brought down to the proper line to catch the twine, which at the time is held down on the top of the studs.

The pinchers having griped the twines to hold fast all the work that has been completed, the two single depressors are permitted to rise gradually as the twines are drawn off during the operation of forming the eye of the next heddle, which is done by the process already described; and as soon as the depressors are elevated the two rocking-hooks are drawn back by their springs and the backing off of the cams, and at the end of their back motion rock back to liberate the twines, which are tied and drawn tight around the bands. As the carriers $T^1$ and $T^2$ are returning to their original position and forming the eye for the next heddle, they both move exactly in the same track and perform precisely the same operations in the reverse direction throughout, with the following exception: When the carrier $T^1$, with its spool, has completed its part of the operation of forming the new eye, and is moving from back of the second stud and between it and the first, instead of moving thence around in front of the first stud, as carrier $T^2$ did in the first-described operation, it is reversed and carried back of and around the first stud to make what has been described as the leese of the harness. This change of motion is effected by reversing the motions of the wheels and chucks on the first and second studs, as fully described above, and by the closing of the spring-switch $c^{11}$, before described, which closes the track back of the second stud the moment the carrier passes it, and therefore compels the carrier to take the track back of the first stud. The operations of forming the tie around the band on the first stud will be the reverse of the one first described, but the operations will be the same. By this alternate reversing of the action of the carriers to form the leese, the knots or ties on this band will be alternately reversed.

It is usual in making heddles to mark every nineteenth heddle, which, by hand, is done by introducing a string called a bier-string. Instead of this, every nineteenth heddle has been marked with any suitable liquid dye contained in a cup by means of a marker, $c$, which dips therein. This marker is in the end of a slide, adapted to work in suitable ways on the frame. It is moved backward and forward by a lever, $F^1$, which is held back by a spring, and pushed forward at the required time by a tappet, $z^6$, on the shaft $D^1$, represented by dotted lines in Fig. 1. But as this shaft makes one complete rotation for each heddle, and the marker is required to be operated only once for every nineteenth heddle, the lever F is moved laterally on its fulcrum-pin to bring it within range of action of a tappet, $z^6$, at the required time, by means of a lever, $j$, connected therewith by means of a rod, $j^1$, and this lever $j$ is acted upon at the required time by a tappet, $j^2$, on a counting-wheel, $e$, of nineteen cogs, which engage a worm on the shaft $o$. This worm is so proportioned as to carry the wheel one cog for each heddle, and the marker $c$ is moved forward out of the liquid dye and brought in contact with every nineteenth heddle to make a mark thereon, which is preferred to the use of a bier-string.

Having thus described the purpose of the invention, the mode of construction which has been practiced with success and the mode of operation for the purpose of forming and tying the knots forming the eye in each heddle and around the bands; of determining the size of the eye and discharging them when completed; of holding the twines to complete the knots around the bands; of forming what is called the leese of the harness; and, finally, of marking every nineteenth heddle or other determined number; it is to be understood that the invention is not limited to the special construction or arrangement of parts as described, but that there is claimed all merely formal variations performing the same mode of operation by equivalent means.

What is claimed as the invention in the within-described machine is—

1. The mechanism, substantially as specified, by means of which each twine is formed in a loop, and the spool or its equivalent carrying such twine carried through such loop to form a knot, and then the spool or its equivalent which carries the other twine passed through such loop, that the twine thus carried through may be griped therein when the knot is drawn tight, thus forming the eye of two twines with a knot in each griping the other twine, as herein set forth.

2. In combination with the fingers or their equivalents on which the knots are tied, the discharger or any equivalent therefor, by means of which the knots are discharged from the said fingers.

3. The fingers located between the side bands, and operating to gage the size of the eye.

4. The fingers operating to gage the size of the eye, in combination with mechanism, substantially such as described, which operates to tighten or draw up the twine out of which the next heddle is formed.

5. The mechanism for forming the knots, substantially as herein described, in combination with pinchers, substantially as described, or any equivalent therefor, for holding the twine tight after the knots at each end of the eye have been closed, and during the operation of drawing the twines tight around the bands, as set forth.

6. The mechanism, substantially as described, by means of which the twines are wrapped around the bands in succession and formed each into a loop, through which the spool or its equivalent for carrying the twine is passed to effect the tie, substantially as described.

7. The mechanism, substantially as described, for forming what is termed the leese of the harness by reversing the motions of the spools, or their equivalents, for carrying the twines, thus carrying the twines alternately on opposite sides of one band, as set forth.

8. The combination of the sliding bar, or its equivalent, and the rods, acting together substantially as described, whereby the leese is preserved after it is formed, and the heddles drawn away from the locality where they are formed by the reception of the heddles as they are formed on the stationary slats, and the movement of the sliding bar, or its equivalent, and the band attached thereto, to which the heddles are tied in the process of formation.

9. In a heddle-making machine, the marker for designating every nineteenth or other heddle, substantially as described.

LYMAN A. COOK,
JOHN KENDRICK,
*Assignees of Joseph S. Winsor.*

In presence of—
N. P. S. THOMAS,
BENJ. F. THURSTON.